(12) United States Patent
Ning et al.

(10) Patent No.: US 11,535,572 B2
(45) Date of Patent: Dec. 27, 2022

(54) METHOD FOR AMMONIUM-ENHANCED FLUE GAS DESULFURIZATION BY USING RED MUD SLURRY

(71) Applicant: Kunming University of Science and Technology, Kunming (CN)

(72) Inventors: Ping Ning, Kunming (CN); Senlin Tian, Kunming (CN); Jianhong Huang, Kunming (CN); Qin Zhang, Kunming (CN); Xuewei Hu, Kunming (CN); Bin Li, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 493 days.

(21) Appl. No.: 16/821,043

(22) Filed: Mar. 17, 2020

(65) Prior Publication Data
US 2020/0299207 A1  Sep. 24, 2020

(30) Foreign Application Priority Data
Mar. 22, 2019 (CN) .......................... 201910223321.0

(51) Int. Cl.
*C05G 3/80* (2020.01)
*C05G 1/00* (2006.01)
(Continued)

(52) U.S. Cl.
CPC .............. *C05G 3/80* (2020.02); *A01C 21/002* (2013.01); *A01C 23/001* (2013.01);
(Continued)

(58) Field of Classification Search
CPC .... C05C 9/00; C05G 1/00; C05G 3/80; C09K 17/08; C05F 5/002; C05F 3/00;
(Continued)

(56) References Cited

FOREIGN PATENT DOCUMENTS

| CN | 105 413 445 A | * | 3/2016 | ............. B01D 53/80 |
| CN | 106 882 932 A | * | 6/2017 | ........... B01D 53/502 |

(Continued)

*Primary Examiner* — Timothy C Vanoy
(74) *Attorney, Agent, or Firm* — NSIP Law

(57) ABSTRACT

The present invention discloses a method for ammonium-enhanced flue gas desulfurization (FGD) by using red mud slurry. The method specifically includes: crushing red mud, sieving the crushed red mud, slurrying the red mud, conducting aeration treatment, adding an ammonium salt and/or ammonia, and conducting natural sedimentation to obtain pretreated red mud slurry and pretreated red mud liquor; adding an ammonium salt and/or ammonia to the slurry, adding water and conducting uniform mixing, conducting pre-FGD, conducting deep desulfurization on treated flue gas by using the pretreated red mud liquor, and directly discharging desulfurized flue gas; and charging the pretreated red mud slurry and the pretreated red mud liquor obtained after the treatment to a replacement tank below, adding lime milk to the replacement tank, conducting stirring and natural sedimentation, conducting soilization on subnatant thick red mud slurry, and refluxing the supernatant to a red mud aeration tank.

10 Claims, 1 Drawing Sheet

(51) Int. Cl.
  *C09K 17/08* (2006.01)
  *C05F 5/00* (2006.01)
  *C05F 3/00* (2006.01)
  *C05C 9/00* (2006.01)
  *B01D 53/50* (2006.01)
  *B01D 53/80* (2006.01)
  *A01C 21/00* (2006.01)
  *A01C 23/00* (2006.01)

(52) U.S. Cl.
  CPC .......... *A01C 23/008* (2013.01); *B01D 53/502* (2013.01); *B01D 53/80* (2013.01); *C05C 9/00* (2013.01); *C05F 3/00* (2013.01); *C05F 5/002* (2013.01); *C05G 1/00* (2013.01); *C09K 17/08* (2013.01); *B01D 2251/304* (2013.01); *B01D 2251/404* (2013.01); *B01D 2257/302* (2013.01); *B01D 2258/0283* (2013.01); *Y02P 10/00* (2015.11)

(58) Field of Classification Search
  CPC ........ Y02A 40/20; Y02P 20/145; Y02P 10/00; Y02W 30/40; Y02E 50/30; A01C 23/008; A01C 21/002; A01C 23/001; B01D 2251/404; B01D 2257/302; B01D 2251/60; B01D 2258/0283; B01D 2251/2062; B01D 53/502; B01D 2252/103; B01D 2251/61; B01D 53/80; B01D 2251/608; B01D 2251/304; B01D 2251/606
  See application file for complete search history.

(56) References Cited

FOREIGN PATENT DOCUMENTS

| CN | 112 295 400 A | * | 2/2021 | ......... B01D 53/8609 |
| DE | 197 07 339 A1 | * | 8/1998 | ............. C02F 1/529 |

* cited by examiner

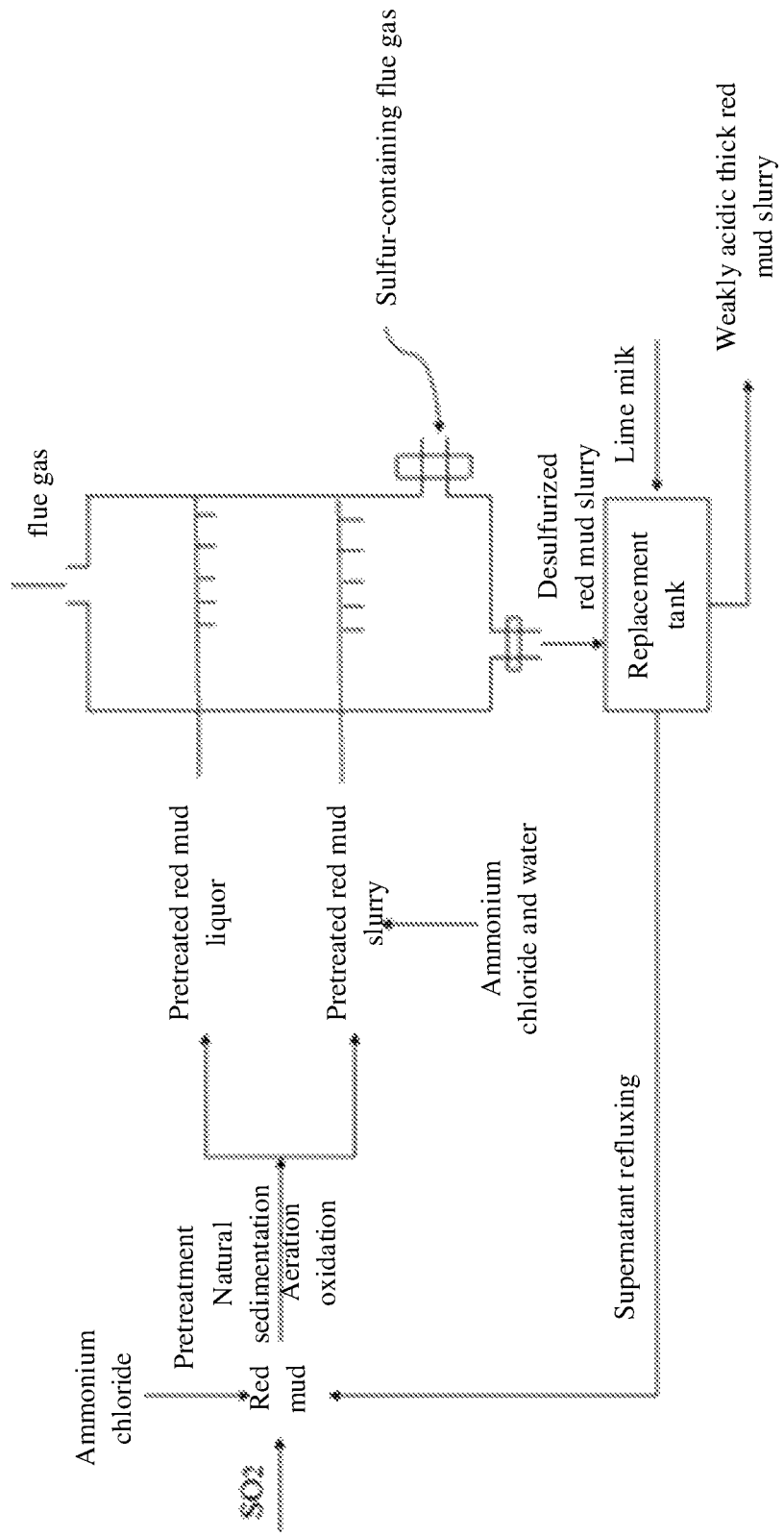

METHOD FOR AMMONIUM-ENHANCED FLUE GAS DESULFURIZATION BY USING RED MUD SLURRY

CROSS-REFERENCE TO RELATED APPLICATIONS

This application claims the benefit under 35 USC 119(a) of Chinese Patent Application No. 201910223321.0 filed on Mar. 22, 2019 in the State Intellectual Property Office of the People's Republic of China, the entire disclosure of which is incorporated herein by reference for all purposes.

TECHNICAL FIELD

The present invention belongs to the environmental protection field, particularly to the technical field of industrial flue gas pollutant control, and specifically relates to a method for ammonium-enhanced flue gas desulfurization (FGD) by using red mud slurry.

BACKGROUND

Sulfur dioxide is one of the main air pollutants, and is an important indicator of air pollution. Serious sulfur dioxide events occurred in many cities in the world, causing many casualties and death. For example, sulfur dioxide can be absorbed into the blood, resulting in toxic and side effects on the whole body. It can destroy the enzyme activity to obviously affect the metabolism of carbohydrates and proteins, thereby causing certain damage to the liver. In China, coal-fired boilers and pit furnaces used in the power industry, chemical industry, smelting industry, etc. exhaust a large amount of flue gas, and the flue gas contains a large amount of sulfur dioxide. Therefore, industrial coal and produced flue gas can only be discharged after being treated to meet the discharge standard.

Red mud is waste residue pollutants discharged during extraction of alumina in the aluminum industry. Generally, 1.0-2.0 tons of red mud is produced on average when every one ton of alumina is produced. As the fourth largest alumina-producing country in the world, China discharges up to millions of tons of red mud every year. pH of red mud is very large, pH of the leachate thereof is 12.1-13.0, and the fluoride content thereof is 11.5-26.7 mg/L. According to the pollution control standard of solid waste in nonferrous metal industry (GB 5058-85), wastewater with pH greater than 12.5 and the fluoride content greater than 50 mg/L is classified as wastewater exceeding the comprehensive wastewater discharge standard. Therefore, red mud is hazardous waste residue, and dealkalization and appropriate treatment of red mud is extremely important.

Currently, methods for treating sulfur dioxide mainly include a lime-limestone method, a sodium alkali method, an ammonia alkali method, a seawater absorption method, a sodium sulfite method, a basic aluminum sulfate method, etc. The lime-limestone method is commonly used in the industry. Although limestone has a low price, it needs to be ground into powder and made into slurry before entering a desulfurization system. In addition, in the method, there is a high particle size requirement, and a liquid-gas ratio is relatively high, leading to relatively high energy consumption; by-products are difficult to satisfy the standard, resulting in a large amount of waste gas; and the biggest problem is secondary pollution caused by desulfurized gypsum as a by-product. On this basis, a method for desulfurizing flue gas by using red mud slurry is developed. Currently, there have been many reports about methods for desulfurizing flue gas by using red mud, but all these methods have their own limitations. The patent CN201210526260.3 discloses a method for desulfurizing boiler flue gas by using red mud. In this method, red mud slurry is conveyed to a desulfurization tower by a desulfurization circulating pump, and is subject to the desulfurization reaction with flue gas introduced from the lower part of the desulfurization tower. The method of this invention uses red mud to treat sulfur-containing flue gas, and has a simple operation and low costs, realizing waste control by waste. However, because pH of red mud leachate is 12.1-13.0, the method does not enhance the dealkalization of red mud. Therefore, the method has not fully used characteristics of the red mud. In addition, the sulfur-containing flue gas is subject to only simple desulfurization without being deeply treated. Therefore, the method has no significant desulfurization effect. Similarly, the patent CN201610463539.X discloses a method for magnesium-enhanced deep FGD by using red mud. In this method, magnesium is used to enhance the dealkalization of red mud; and red mud slurry and red mud supernate are respectively used for pre-desulfurization and deep FGD. However, dealkalized red mud obtained through treatment is not further treated for soilization. Therefore, in view of requirements for recycling of red mud wastes and industrial FGD, it is very necessary to develop a function-enhanced technology for desulfurizing flue gas by using red mud, to realize effective industrial FGD and recycling of red mud.

SUMMARY

To overcome the shortcomings of the prior art, the present invention provides a method for ammonium-enhanced flue gas desulfurization (FGD) by using red mud slurry, to realize effective industrial FGD and recycling of red mud.

The technical solution of the present invention is as follows.

A method for ammonium-enhanced FGD by using red mud slurry is provided, including the following steps:

(1) crushing red mud, sieving the crushed red mud through a sieve with 50-200 meshes, slurrying the red mud by using slurry liquid according to a liquid-solid ratio of (25-30):1, and introducing sulfur dioxide and oxygen gas for aeration of red mud slurry in a red mud aeration tank; and adding an ammonium salt and/or ammonia to the red mud aeration tank, conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas;

(2) adding an ammonium salt and/or ammonia to the pretreated red mud slurry, adding water and conducting uniform mixing, allowing the sulfur-containing flue gas to be in countercurrent contact with the mixture in a desulfurization tower for pre-desulfurization, conducting deep desulfurization on treated flue gas by using the pretreated red mud liquor, and directly discharging desulfurized flue gas; and (3) charging the pretreated red mud slurry and the pretreated red mud liquor treated in step (2) to a replacement tank below, adding lime milk to the replacement tank, conducting stirring and natural sedimentation, comprehensively utilizing subnatant thick red mud slurry for soilization, and refluxing the supernatant to the red mud aeration tank.

Further, the slurry liquid in step (1) is any one or more of industrial water, acidic wastewater, and supernatant in the replacement tank.

Further, the acidic wastewater is any one or more types of wastewater respectively containing a relatively low concentration of sulfuric acid, phosphoric acid, nitric acid, hydrochloric acid, organic acid, etc.

Further, a volume ratio of the sulfur dioxide to the oxygen gas in step (1) is 1:1-6:1.

Further, the ammonium salt is any one or more of ammonium chloride, ammonium sulfate, ammonium nitrate, ammonium carbonate, ammonium phosphate, ammonium sulfide, ammonium bicarbonate, ammonium persulfate, and a quaternary ammonium salt.

Further, the ammonia is ammonia gas or ammonia water.

Further, a dosage of the ammonium salt and/or ammonia in step (1) is 0.5-5% of the amount of the red mud.

Further, a dosage of the ammonium salt and/or ammonia in step (2) is 0.5-5% of the amount of the pretreated red mud slurry.

Further, pH of both the pretreated red mud slurry and the pretreated red mud liquor in step (1) is controlled to be greater than 8.5.

Further, pH of the subnatant thick red mud slurry in the replacement tank in step (3) is controlled to be 6-7.

Further, the soilization in step (3) specifically includes: conducting suction filtration on the subnatant thick red mud slurry by using a suction filtration machine, adding a soil remediation agent to red mud filter residue, uniformly spreading the mixture on soil with normal physicochemical properties, and mixing the mixture with the original soil.

Further, the soil remediation agent includes the following raw materials (by weight): 10-25 parts of waste biomass powder, 1-5 parts of organic manure, and 0.5-1.5 parts of urea.

Further, the waste biomass powder is one or more of crop straw powder, biogas residue, and biomass sawdust.

Further, the organic manure is one or more of pig manure, chicken manure, cow manure, dog manure, horse manure, and duck manure.

Further, a mass ratio of the soil remediation agent to the red mud filter residue is 1:(5-10). Compared with the prior art, the present invention has the following advantages:

1. In the present invention, red mud is used to absorb sulfur dioxide in flue gas, which can effectively reduce toxic and harmful substances and consumes relatively low energy.

2. In the present invention, FGD by using red mud includes pretreatment and deep treatment. The method can more effectively remove sulfur dioxide from flue gas. In addition, in a pre-desulfurization zone, bound sodium, bound calcium, and other alkaline components in red mud can be effectively used to fully remove or transform sulfur dioxide. In this way, not only sulfur dioxide can be removed from flue gas, but also red mud can be further dealkalized.

3. N elements are increased after the red mud slurry having absorbed flue gas is treated in the replacement tank, and pH of the treated red mud slurry is equal to pH of normal soil. Therefore, treated red mud can be soilized, reducing the pollution to the surrounding environment resulting from red mud.

4. Biomass wastes such as agricultural crop straws and animal wastes are used to prepare a soil remediation agent. This can increase nutrient substances and elements required for plant growth to soilize red mud filter residue, thereby effectively utilizing agricultural wastes and realizing waste control by waste.

BRIEF DESCRIPTION OF DRAWINGS

The Figure is a flowchart of a process according to the present invention.

DETAILED DESCRIPTION

The present invention is further described below with reference to embodiments and accompanying drawings without limiting the present invention in any way. Any transformation or replacement made based on the teachings of the present invention shall fall within the protection scope of the present invention.

Embodiment 1

As shown the Figure, a method for ammonium-enhanced FGD by using red mud slurry is provided, specifically including the following steps:

(1) crushing red mud, sieving the crushed red mud through a sieve with 50 meshes, and slurrying the red mud by using slurry liquid according to a liquid-solid ratio of 25:1; introducing sulfur dioxide and oxygen gas for aeration of red mud slurry, where a volume ratio of the sulfur dioxide to the oxygen gas is 1:1; adding ammonium sulfate, where a dosage of the ammonium sulfate is 0.5% of the amount of the red mud; and conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas, where the slurry liquid is acidic wastewater containing sulfuric acid; and pH of both the pretreated red mud slurry and the pretreated red mud liquor is controlled to be greater than 8.5;

(2) adding ammonium sulfate to the pretreated red mud slurry, where a dosage of the ammonium sulfate is 0.5% of the amount of the pretreated red mud slurry; adding water and conducting uniform mixing; allowing the sulfur-containing flue gas to be in countercurrent contact with the mixture in a desulfurization tower for pre-desulfurization; conducting deep desulfurization on treated flue gas by using the pretreated red mud liquor; and directly discharging desulfurized flue gas;

(3) charging the pretreated red mud slurry and the pretreated red mud liquor treated in step (2) to a replacement tank below; adding lime milk to the replacement tank; conducting stirring until slightly alkaline pH is attained; conducting natural sedimentation; comprehensively utilizing subnatant thick red mud slurry for soilization, where pH of the subnatant thick red mud slurry in the replacement tank is controlled to be 6-7; and refluxing the supernatant to a red mud aeration tank; and (4) conducting suction filtration on the subnatant thick red mud slurry by using a suction filtration machine, and adding a soil remediation agent to red mud filter residue, where a mass ratio of the soil remediation agent to the red mud filter residue is 1:5; and uniformly spreading the mixture on soil with normal physicochemical properties, and mixing the mixture with the original soil, where the soil remediation agent includes the following raw materials (by weight): 15 parts of waste biomass powder, 3 parts of organic manure, and 1 part of urea.

Simulated flue gas containing sulfur dioxide with an initial concentration of 4000 mg/m$^3$ was introduced into the desulfurization tower, where a flow rate of the flue gas was controlled at 2.5 m$^3$/h, the flue gas temperature was approximately 100° C., a liquid-gas ratio in a pre-desulfurization zone was 7 L/m$^3$, and a liquid-gas ratio in a deep desulfurization zone was 9 L/m$^3$.

A concentration of sulfur dioxide in desulfurized exhaust was monitored and recorded online. The result showed that the concentration of sulfur dioxide in the simulated flue gas remained at approximately 110 mg/m$^3$ after absorption. Accordingly, a calculated removal rate of sulfur dioxide was 97.25%.

After Vetiver grass had been planted in remedied red mud soil for 10 days, a germination rate of the Vetiver grass was 70%.

Embodiment 2

A method for ammonium-enhanced FGD by using red mud slurry is provided, specifically including the following steps:

(1) crushing red mud, sieving the crushed red mud through a sieve with 100 meshes, and slurrying the red mud by using slurry liquid according to a liquid-solid ratio of 28:1; introducing sulfur dioxide and oxygen gas for aeration of red mud slurry, where a volume ratio of the sulfur dioxide to the oxygen gas is 3:1; adding ammonium nitrate, where a dosage of the ammonium nitrate is 1% of the amount of the red mud; and conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas, where the slurry liquid is industrial water; and pH of both the pretreated red mud slurry and the pretreated red mud liquor is controlled to be greater than 8.5;

(2) adding ammonium nitrate to the pretreated red mud slurry, where a dosage of the ammonium nitrate is 1% of the amount of the pretreated red mud slurry; adding water and conducting uniform mixing; allowing the sulfur-containing flue gas to be in countercurrent contact with the mixture in a desulfurization tower for pre-desulfurization; conducting deep desulfurization on treated flue gas by using the pretreated red mud liquor; and directly discharging desulfurized flue gas;

(3) charging the pretreated red mud slurry and the pretreated red mud liquor treated in step (2) to a replacement tank below; adding lime milk to the replacement tank; conducting stirring until slightly alkaline pH is attained; conducting natural sedimentation; comprehensively utilizing subnatant thick red mud slurry for soilization, where pH of the subnatant thick red mud slurry in the replacement tank is controlled to be 6-7; and refluxing the supernatant to a red mud aeration tank; and (4) conducting suction filtration on the subnatant thick red mud slurry by using a suction filtration machine, and adding a soil remediation agent to red mud filter residue, where a mass ratio of the soil remediation agent to the red mud filter residue is 1:10; and uniformly spreading the mixture on soil with normal physicochemical properties, and mixing the mixture with the original soil, where the soil remediation agent includes the following raw materials (by weight): 15 parts of waste biomass powder, 3 parts of organic manure, and 1 part of urea.

Simulated flue gas containing sulfur dioxide with an initial concentration of 4000 mg/m$^3$ was introduced into the desulfurization tower, where a flow rate of the flue gas was controlled at 2.5 m$^3$/h, the flue gas temperature was approximately 80° C., a liquid-gas ratio in a pre-desulfurization zone was 8 L/m$^3$, and a liquid-gas ratio in a deep desulfurization zone was 10 L/m$^3$.

A concentration of sulfur dioxide in desulfurized exhaust was monitored and recorded online. The result showed that the concentration of sulfur dioxide in the simulated flue gas remained at approximately 90 mg/m$^3$ after absorption. Accordingly, a calculated removal rate of sulfur dioxide was 97.75%.

After Vetiver grass had been planted in remedied red mud soil for 10 days, a germination rate of the Vetiver grass was 75%.

Embodiment 3

A method for ammonium-enhanced FGD by using red mud slurry is provided, specifically including the following steps:

(1) crushing red mud, sieving the crushed red mud through a sieve with 200 meshes, and slurrying the red mud by using slurry liquid according to a liquid-solid ratio of 30:1; introducing sulfur dioxide and oxygen gas for aeration of red mud slurry, where a volume ratio of the sulfur dioxide to the oxygen gas is 6:1; adding ammonium phosphate, where a dosage of the ammonium phosphate is 1.5% of the amount of the red mud; and conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas, where the slurry liquid is industrial water and supernatant in a replacement tank, and pH of both the pretreated red mud slurry and the pretreated red mud liquor is controlled to be greater than 8.5;

(2) adding ammonium phosphate to the pretreated red mud slurry, where a dosage of the ammonium phosphate is 1.5% of the amount of the pretreated red mud slurry; adding water and conducting uniform mixing; allowing the sulfur-containing flue gas to be in countercurrent contact with the mixture in a desulfurization tower for pre-desulfurization; conducting deep desulfurization on treated flue gas by using the pretreated red mud liquor; and directly discharging desulfurized flue gas;

(3) charging the pretreated red mud slurry and the pretreated red mud liquor treated in step (2) to the replacement tank below; adding lime milk to the replacement tank; conducting stirring until slightly alkaline pH is attained; conducting natural sedimentation; comprehensively utilizing subnatant thick red mud slurry for soilization, where pH of the subnatant thick red mud slurry in the replacement tank is controlled to be 6-7; and refluxing the supernatant to a red mud aeration tank as the slurry liquid; and (4) conducting suction filtration on the subnatant thick red mud slurry by using a suction filtration machine, and adding a soil remediation agent to red mud filter residue, where a mass ratio of the soil remediation agent to the red mud filter residue is 1:8; and uniformly spreading the mixture on soil with normal physicochemical properties, and mixing the mixture with the original soil, where the soil remediation agent includes the following raw materials (by weight): 15 parts of waste biomass powder, 3 parts of organic manure, and 1 part of urea.

Simulated flue gas containing sulfur dioxide with an initial concentration of 4000 mg/m$^3$ was introduced into the desulfurization tower, where a flow rate of the flue gas was controlled at 2.5 m$^3$/h, the flue gas temperature was approximately 80° C., a liquid-gas ratio in a pre-desulfurization zone was 7 L/m$^3$, and a liquid-gas ratio in a deep desulfurization zone was 9 L/m$^3$.

A concentration of sulfur dioxide in desulfurized exhaust was monitored and recorded online. The result showed that the concentration of sulfur dioxide in the simulated flue gas remained at approximately 170 mg/m³ after absorption. Accordingly, a calculated removal rate of sulfur dioxide was 95.75%.

After Vetiver grass had been planted in remedied red mud soil for 10 days, a germination rate of the Vetiver grass was 68%.

Embodiment 4

A method for ammonium-enhanced FGD by using red mud slurry is provided, including the following steps:

(1) crushing red mud, sieving the crushed red mud through a sieve with 80 meshes, and slurrying the red mud by using slurry liquid according to a liquid-solid ratio of 26:1; introducing sulfur dioxide and oxygen gas for aeration of red mud slurry in a red mud aeration tank, where a volume ratio of the sulfur dioxide to the oxygen gas is 2:1; adding ammonium chloride to the red mud aeration tank, where a dosage of the ammonium chloride is 2% of the amount of the red mud; and conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas, where the slurry liquid is industrial water, acidic wastewater, supernatant in a replacement tank; the acidic wastewater is wastewater containing a relatively low concentration of nitric acid; and pH of both the pretreated red mud slurry and the pretreated red mud liquor is controlled to be greater than 8.5;

(2) adding ammonium chloride to the pretreated red mud slurry, where a dosage of the ammonium chloride is 2% of the amount of the pretreated red mud slurry; adding water and conducting uniform mixing; allowing the sulfur-containing flue gas to be in countercurrent contact with the mixture in a desulfurization tower for pre-desulfurization; conducting deep desulfurization on treated flue gas by using the pretreated red mud liquor; and directly discharging desulfurized flue gas; and (3) charging the pretreated red mud slurry and the pretreated red mud liquor treated in step (2) to the replacement tank below; adding lime milk to the replacement tank; conducting stirring and natural sedimentation; comprehensively utilizing subnatant thick red mud slurry for soilization, where pH of the subnatant thick red mud slurry in the replacement tank is controlled to be 6; and refluxing the supernatant to the red mud aeration tank.

The soilization specifically includes: conducting suction filtration on the subnatant thick red mud slurry by using a suction filtration machine, and adding a soil remediation agent to red mud filter residue, where a mass ratio of the soil remediation agent to the red mud filter residue is 1:6; and uniformly spreading the mixture on soil with normal physicochemical properties, and mixing the mixture with the original soil, where the soil remediation agent includes the following raw materials (by weight): 10 parts of waste biomass powder, 1 part of organic manure, and 0.5 part of urea; the waste biomass powder is crop straw powder; and the organic manure is pig manure.

Through test, a removal rate of sulfur dioxide in the flue gas in this embodiment was 96.15%; and after Vetiver grass had been planted in remedied red mud soil for 10 days, a germination rate of the Vetiver grass was 77%.

Embodiment 5

A method for ammonium-enhanced FGD by using red mud slurry is provided, including the following steps:

(1) crushing red mud, sieving the crushed red mud through a sieve with 120 meshes, and slurrying the red mud by using slurry liquid according to a liquid-solid ratio of 27:1; introducing sulfur dioxide and oxygen gas for aeration of red mud slurry in a red mud aeration tank, where a volume ratio of the sulfur dioxide to the oxygen gas is 3:1; adding an ammonium salt and ammonia to the red mud aeration tank, where the ammonium salt is a mixture of ammonium chloride, ammonium sulfate, ammonium nitrate, ammonium carbonate, ammonium phosphate, ammonium sulfide, ammonium bicarbonate, ammonium persulfate, and a quaternary ammonium salt, the ammonia is ammonia water, and a dosage of the ammonium salt and ammonia is 2.5% of the amount of the red mud; and conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas, where the slurry liquid is any one or more of acidic wastewater and supernatant in a replacement tank, the acidic wastewater is wastewater containing a relatively low concentration of organic acid, and pH of both the pretreated red mud slurry and the pretreated red mud liquor is controlled to be greater than 8.8.

(2) adding an ammonium salt and ammonia to the pretreated red mud slurry, where the ammonium salt is a mixture of ammonium chloride, ammonium sulfate, ammonium nitrate, ammonium carbonate, ammonium phosphate, ammonium sulfide, ammonium bicarbonate, ammonium persulfate, and a quaternary ammonium salt, the ammonia is ammonia water, and a dosage of the ammonium salt and ammonia is 2.5% of the amount of the pretreated red mud slurry; adding water and conducting uniform mixing; allowing the sulfur-containing flue gas to be in countercurrent contact with the mixture in a desulfurization tower for pre-desulfurization; conducting deep desulfurization on treated flue gas by using the pretreated red mud liquor; and directly discharging desulfurized flue gas; and (3) charging the pretreated red mud slurry and the pretreated red mud liquor treated in step (2) to the replacement tank below; adding lime milk to the replacement tank; conducting stirring and natural sedimentation; comprehensively utilizing subnatant thick red mud slurry for soilization, where pH of the subnatant thick red mud slurry in the replacement tank is controlled to be 7; and refluxing the supernatant to the red mud aeration tank.

The soilization specifically includes: conducting suction filtration on the subnatant thick red mud slurry by using a suction filtration machine, and adding a soil remediation agent to red mud filter residue, where a mass ratio of the soil remediation agent to the red mud filter residue is 1:7; and uniformly spreading the mixture on soil with normal physicochemical properties, and mixing the mixture with the original soil, where the soil remediation agent includes the following raw materials (by weight): 25 parts of waste biomass powder, 5 part of organic manure, and 1.5 parts of urea; the waste biomass powder is biogas residue; and the organic manure is chicken manure.

Through test, a removal rate of sulfur dioxide in the flue gas in this embodiment was 96.88%; and after Vetiver grass had been planted in remedied red mud soil for 10 days, a germination rate of the Vetiver grass was 72%.

Embodiment 6

A method for ammonium-enhanced FGD by using red mud slurry is provided, including the following steps:

(1) crushing red mud, sieving the crushed red mud through a sieve with 180 meshes, and slurrying the red mud by using slurry liquid according to a liquid-solid ratio of 29:1; introducing sulfur dioxide and oxygen gas for aeration of red mud slurry in a red mud aeration tank, where a volume ratio of the sulfur dioxide to the oxygen gas is 4:1; adding ammonia water to the red mud aeration tank, where a dosage of the ammonia water is 3% of the amount of the red mud; and conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas, where pH of both the pretreated red mud slurry and the pretreated red mud liquor is controlled to be greater than 9;

(2) adding ammonia water to the pretreated red mud slurry, where a dosage of the ammonia water is 3% of the amount of the pretreated red mud slurry; adding water and conducting uniform mixing; allowing the sulfur-containing flue gas to be in countercurrent contact with the mixture in a desulfurization tower for pre-desulfurization; conducting deep desulfurization on treated flue gas by using the pretreated red mud liquor; and directly discharging desulfurized flue gas; and (3) charging the pretreated red mud slurry and the pretreated red mud liquor treated in step (2) to a replacement tank below; adding lime milk to the replacement tank; conducting stirring and natural sedimentation; comprehensively utilizing subnatant thick red mud slurry for soilization, where pH of the subnatant thick red mud slurry in the replacement tank is controlled to be 6.5; and refluxing the supernatant to the red mud aeration tank.

The soilization specifically includes: conducting suction filtration on the subnatant thick red mud slurry by using a suction filtration machine, and adding a soil remediation agent to red mud filter residue, where a mass ratio of the soil remediation agent to the red mud filter residue is 1:9; and uniformly spreading the mixture on soil with normal physicochemical properties, and mixing the mixture with the original soil, where the soil remediation agent includes the following raw materials (by weight): 20 parts of waste biomass powder, 3 parts of organic manure, and 1 part of urea; the waste biomass powder is crop straw powder, biogas residue, and biomass sawdust; and the organic manure is pig manure, chicken manure, cow manure, dog manure, horse manure, and duck manure.

Through test, a removal rate of sulfur dioxide in the flue gas in this embodiment was 98.75%; and after Vetiver grass had been planted in remedied red mud soil for 10 days, a germination rate of the Vetiver grass was 80%.

What is claimed is:

1. A method for ammonium-enhanced flue gas desulfurization (FGD) by using red mud slurry, comprising the following steps:
    (1) crushing red mud, sieving the crushed red mud through a sieve with 50-200 meshes, slurrying the red mud by using slurry liquid according to a liquid-solid ratio of (25-30):1,; and introducing sulfur dioxide and oxygen gas for aeration of red mud slurry in a red mud aeration tank, adding an ammonium salt and/or ammonia to the red mud aeration tank, conducting natural sedimentation to obtain pretreated red mud slurry and pretreated red mud liquor, and using the pretreated red mud slurry and the pretreated red mud liquor as pre-desulfurization slurry and deep desulfurization liquor of sulfur-containing flue gas;
    (2) adding an ammonium salt and/or ammonia to the pretreated red mud slurry, adding water and conducting uniform mixing, allowing the sulfur-containing flue gas to be in countercurrent contact with the mixture in a desulfurization tower for pre-desulfurization, conducting deep desulfurization on treated flue gas by using the pretreated red mud liquor, and directly discharging desulfurized flue gas; and
    (3) charging the pretreated red mud slurry and the pretreated red mud liquor treated in step (2) to a replacement tank below, adding lime milk to the replacement tank, conducting stirring and natural sedimentation, comprehensively utilizing subnatant thick red mud slurry for soilization, and refluxing the supernatant to the red mud aeration tank.

2. The method for ammonium-enhanced FGD by using red mud slurry according to claim 1, wherein the slurry liquid in step (1) is any one or more of industrial water, acidic wastewater, and supernatant in the replacement tank.

3. The method for ammonium-enhanced FGD by using red mud slurry according to claim 1, wherein a volume ratio of the sulfur dioxide to the oxygen gas in step (1) is 1:1-6:1.

4. The method for ammonium-enhanced FGD by using red mud slurry according to claim 1, wherein the ammonium salt is any one or more of ammonium chloride, ammonium sulfate, ammonium nitrate, ammonium carbonate, ammonium phosphate, ammonium sulfide, ammonium bicarbonate, ammonium persulfate, and a quaternary ammonium salt; and the ammonia is ammonia gas or ammonia water.

5. The method for ammonium-enhanced FGD by using red mud slurry according to claim 1, wherein a dosage of the ammonium salt and/or ammonia in step (1) is 0.5-5% of the amount of the red mud, and a dosage of the ammonium salt and/or ammonia in step (2) is 0.5-5% of the amount of the pretreated red mud slurry.

6. The method for ammonium-enhanced FGD by using red mud slurry according to claim 1, wherein pH of both the pretreated red mud slurry and the pretreated red mud liquor in step (1) is controlled to be greater than 8.5.

7. The method for ammonium-enhanced FGD by using red mud slurry according to claim 1, wherein pH of the subnatant thick red mud slurry in the replacement tank in step (3) is controlled to be 6-7.

8. The method for ammonium-enhanced FGD by using red mud slurry according to claim 1, wherein the soilization in step (3) is specifically comprises: conducting suction filtration on the subnatant thick red mud slurry by using a suction filtration machine, adding a soil remediation agent to red mud filter residue, uniformly spreading the mixture on soil with normal physicochemical properties, and mixing the mixture with the original soil.

9. The method for ammonium-enhanced FGD by using red mud slurry according to claim 8, wherein the soil remediation agent comprises the following raw materials (by weight): 10-25 parts of waste biomass powder, 1-5 parts of organic manure, and 0.5-1.5 parts of urea; the waste biomass powder is one or more of crop straw powder, biogas residue, and biomass sawdust; and the organic manure is one or more of pig manure, chicken manure, cow manure, dog manure, horse manure, and duck manure.

10. The method for ammonium-enhanced FGD by using red mud slurry according to claim 8, wherein a mass ratio of the soil remediation agent to the red mud filter residue is 1:(5-10).

* * * * *